United States Patent
Herzog et al.

(10) Patent No.: US 9,512,913 B2
(45) Date of Patent: Dec. 6, 2016

(54) INJECTION-MOLDED POCKET-TYPE CHAIN WHEEL MADE OF FIBER-REINFORCED PLASTIC

(71) Applicant: RUD KETTEN RIEGER & DIETZ GMBH U. CO. K.G., Aalen (DE)

(72) Inventors: Heribert Herzog, Aalen-Ebnat (DE); Achim Frick, Aalen (DE); Timo Dolde, Grossbettlingen (DE); Ralph Straberger, Kirchheim (DE)

(73) Assignee: Rud Ketten Rieger & Dietz GmbH U. Co. K.G. (DE)

( * ) Notice: Subject to any disclaimer, the term of this patent is extended or adjusted under 35 U.S.C. 154(b) by 56 days.

(21) Appl. No.: 14/356,523

(22) PCT Filed: Oct. 16, 2012

(86) PCT No.: PCT/EP2012/070503
§ 371 (c)(1),
(2) Date: May 6, 2014

(87) PCT Pub. No.: WO2013/068208
PCT Pub. Date: May 16, 2013

(65) Prior Publication Data
US 2014/0315674 A1    Oct. 23, 2014

(30) Foreign Application Priority Data
Nov. 10, 2011  (DE) .......... 10 2011 055 204

(51) Int. Cl.
*F16H 55/30*  (2006.01)
*F16H 7/06*  (2006.01)
(Continued)

(52) U.S. Cl.
CPC .............. *F16H 55/30* (2013.01); *F16H 55/00* (2013.01); *F16H 55/303* (2013.01); *F16H 2055/065* (2013.01)

(58) Field of Classification Search
CPC ..... F16H 55/303; F16G 13/02; B65G 19/20; B65G 23/06; B62M 9/10
USPC .......................................... 474/155
See application file for complete search history.

(56) References Cited

U.S. PATENT DOCUMENTS 325,539 A * 9/1885 Heerman ............... 474/164
662,768 A * 11/1900 Crowe ............... 110/330
(Continued)

FOREIGN PATENT DOCUMENTS

DE    1789814 U    6/1959
DE    6810638 U    5/1969
(Continued)

OTHER PUBLICATIONS

International Search Report for PCT/EP2012/070503, dated Dec. 5, 2012, 6 pages.
(Continued)

*Primary Examiner* — Henry Liu
(74) *Attorney, Agent, or Firm* — Edell, Shapiro & Finnan, LLC

(57) ABSTRACT

The invention relates to a pocket-type chain wheel (1) for link chains (22), in particular round or profile steel chains. A circumferential surface (2) of said pocket-type chain wheel is provided with pockets (3, 4) having alternately different shapes in the circumferential direction (U) and extending radially into the pocket-type chain wheel. In order to diminish noise generation in operation, reduce vibrations generated during operation and simultaneously cut production costs, the present invention discloses that the pocket-type chain wheel (1) is produced in one piece from a fiber-reinforced plastic by means of an injection molding process. Preferably, a main fiber direction (30) extends in a central area between the pockets (3, 4) and a hub (8) in the radial direction.

16 Claims, 3 Drawing Sheets

(51) Int. Cl.
*F16H 55/00* (2006.01)
*F16H 55/06* (2006.01)

(56) References Cited

U.S. PATENT DOCUMENTS

| | | | | |
|---|---|---|---|---|
| 2,321,702 A * | 6/1943 | Renkin | | 474/155 |
| 2,535,985 A * | 12/1950 | Manney | | 474/164 |
| 3,304,792 A * | 2/1967 | Kardol | | 474/155 |
| 3,362,239 A * | 1/1968 | Kaye et al. | | 474/155 |
| 3,415,135 A * | 12/1968 | Royer et al. | | 474/155 |
| 4,108,014 A * | 8/1978 | Schreyer et al. | | 474/155 |
| 4,850,942 A * | 7/1989 | Dalferth | | 474/155 |
| 4,968,983 A * | 11/1990 | Maeda | | 343/703 |
| 5,205,793 A * | 4/1993 | Jones | | 474/141 |
| 5,376,220 A * | 12/1994 | Campbell | | 156/581 |
| 5,402,877 A * | 4/1995 | Thiele et al. | | 198/731 |
| 5,520,585 A * | 5/1996 | Green et al. | | 474/206 |
| 5,533,938 A * | 7/1996 | Dalferth | | 474/164 |
| 6,138,819 A * | 10/2000 | Bogle et al. | | 198/635 |
| 6,925,794 B2 * | 8/2005 | Dalferth et al. | | 59/78 |
| 8,038,558 B2 * | 10/2011 | Klabisch et al. | | 474/155 |
| 8,360,912 B2 * | 1/2013 | Klabisch et al. | | 474/206 |
| 2008/0113837 A1 * | 5/2008 | Ketterl et al. | | 474/140 |
| 2008/0224440 A1 * | 9/2008 | Masuda et al. | | 280/259 |
| 2008/0274847 A1 * | 11/2008 | Lemberger et al. | | 474/135 |
| 2010/0184546 A1 * | 7/2010 | Singer | | 474/135 |
| 2012/0038086 A1 * | 2/2012 | Pini et al. | B29C 33/485 | 264/313 |
| 2012/0305870 A1 * | 12/2012 | Ruef et al. | | 254/390 |
| 2014/0335983 A1 * | 11/2014 | Iwai et al. | | 474/78 |
| 2014/0335986 A1 * | 11/2014 | Iwai et al. | | 474/155 |
| 2014/0335987 A1 * | 11/2014 | Iwai et al. | | 474/161 |

FOREIGN PATENT DOCUMENTS

| | | |
|---|---|---|
| DE | 2747070 A1 | 4/1979 |
| DE | 3244361 C1 | 11/1983 |
| DE | 4130073 A1 | 3/1993 |
| DE | 19731593 C1 | 11/1998 |
| DE | 10145603 A1 | 4/2003 |
| DE | 102004009535 A1 | 9/2005 |
| DE | 202005007915 U1 | 9/2006 |
| DE | 102006036162 A1 | 2/2008 |
| DE | 102008018514 A1 | 10/2009 |
| EP | 1083112 A2 | 3/2001 |
| FR | 1401923 A | 6/1965 |
| FR | 1536434 A | 8/1968 |
| JP | H08326451 | 12/1996 |
| JP | 2009545709 | 12/2009 |
| WO | 2010092081 A1 | 8/2010 |

OTHER PUBLICATIONS

Japanese Office Action for Japanese counterpart Application No. 2014-540379, dated Aug. 4, 2015 with English Translation (9 pages).
Search Report from the German Patent Office for German Application No. 10 2011 055 204.9 dated Nov. 23, 2015; 7 pages.
Office Action from Japanese Patent Application No. 2014-540379, with English translation, dated Jan. 5, 2016.

* cited by examiner

INJECTION-MOLDED POCKET-TYPE CHAIN WHEEL MADE OF FIBER-REINFORCED PLASTIC

The invention relates to a pocket-type chain wheel for link chains, in particular round or profile steel chains, the circumferential surface of said pocket-type chain wheel being provided with pockets having alternately different shapes in the circumferential direction and extending radially into the pocket-type chain wheel.

Pocket-type chain wheels, by means of which link chains are deflected or driven, have already been known for a long time. The most widely used pocket-type chain wheels are those for round or profile steel chains. They are used in conveying equipment, e.g. in chain drives or hoisting devices.

The shape of the pockets depends, on the one hand, on the shape of the chain links of the link chains. The pocket shape for round steel chains, whose links have a substantially circular material cross-section, differs from the pocket shape for profile steel chains, whose cross-section is not circular but e.g. rectangular. On the other hand, the shape of the pockets is also determined by the orientation with which the link chain runs onto the circumferential surface. Two different orientations have established themselves on the market: according to a first variant, the link chain can rest on the circumferential surface in a straight orientation, so that the planes defined by the chain links extend alternately perpendicular to and parallel to the axial direction. In addition, the link chain may also be conducted obliquely over the pocket-type chain wheel or the circumferential surfaces, so that the planes defined by the chain links extend approx. at an angle of 45° to 50° relative to the direction of rotation or axial direction of the pocket-type chain wheel.

Pocket-type chain wheels are already known from the prior art.

DE 41 30 073 A1 discloses e.g. a pocket-type chain wheel, which is adapted to be used as a deflection pulley and in the case of which the chain, here a round steel chain, is conducted straight over the circumferential surface of the chain wheel.

DE 197 31 A93 C1 deals with a pocket-type chain wheel for a profile chain with a D-shaped profile cross-section. The chain is guided obliquely over the circumferential surface of the chain wheel.

Pocket-type chain wheels for round steel chains running obliquely onto the chain wheel are shown in DE 94 09 458 U1, DE 10 2004 009 A35 A1 and DE 20 2005 007 915 U1.

Disadvantages of these known chain wheels are, in addition to a high manufacturing price caused by the complicated manufacturing process, the high noise generation during operation, which is closely related to the vibration behavior of the pocket-type chain wheels. The structural designs of the known pocket-type chain wheels additionally entail the risk that the load may start to vibrate in response to rapid load changes, in particular in the case of shifting jerks, and at high rotational speeds.

Taking this problem as a basis, the person skilled in the art finds himself confronted with the task of creating a less expensive pocket-type chain wheel, which makes less noise and is subjected to less vibrations when in use.

According to the present invention, the person skilled in the art solves this task for the pocket-type chain wheel referred to at the beginning by producing the pocket-type chain wheel in one piece from at least one fiber-reinforced plastic by means of an injection molding process.

This solution provides a pocket-type chain wheel that can be produced at low cost and with consistent quality in high numbers. The plastic material damps shocks and vibrations much more effectively than the known pocket-type chain wheels made of metal. This results not only in a reduction of the noise generated in operation but also in improved vibration damping. By using a fiber-reinforced plastic, a high strength and a high wear resistance are achieved, so that the pocket-type chain wheel according to the present invention can take up high loads.

This solution can be improved still further by additional embodiments, which are advantageous in themselves independently of one another and which will be described in the following.

According to a first advantageous embodiment, the plastic may be a glass fiber reinforced plastic. In comparison with carbon fiber reinforced plastic, glass fiber reinforced plastic proved to be more advantageous for the production of pocket-type chain wheels in internal tests, since, when operated continuously, pocket-type chain wheels made of a carbon fiber reinforced plastic seem to be more likely to undergo brittle fracture than pocket-type chain wheels made of a glass fiber reinforced plastic.

In order to protect the chain links that rest on the pocket bottom within the pockets against alternating bending loads reducing their service life, the bottom of the pockets, on which each chain link rests, should exhibit an increased bending stiffness. The bending strength of the pocket-type chain wheel may be increased especially on the bottom of the pockets in comparison with the interior.

In the interior of the pocket-type chain wheel, the load carried by the link chain builds up a high compressive stress, primarily in the area between the pockets on the entwined side of the pocket-type chain wheel and the hub. In order to take up this compressive load, the interior of the pocket-type chain wheel exhibits a higher pressure stability than the boundary area of the pocket-type chain wheel, in particular the bottom of the pockets.

The bending stiffness of the boundary layer and the pressure stability of the interior of the chain wheel can be adjusted by controlling the temperature of the mold and/or melt during the injection molding process.

The pockets of the pocket-type chain wheel according to the present invention are preferably produced in a single production step together with the remainder of the pocket-type chain wheel in the course of the injection-molding process. The pockets are, in particular, not subjected to a finishing treatment, e.g. a chip-removing finishing treatment. In order to increase the bending strength, a chipless, e.g. a chemical or thermal finishing treatment may, however, be carried out.

For obtaining smooth supports for the link chains in the area of the pocket, it will be of advantage when the fiber length does not exceed 1 mm.

The load carrying capacity and the wear resistance of the plastic wheel can be increased in accordance with a further advantageous embodiment, when the main fiber directions of the fibers of the fiber-reinforced plastic are distributed symmetrically with respect to a center plane of the pocket-type chain wheel, said center plane extending perpendicular to the axial direction. Since also the loads acting on the pocket-type chain wheel are normally directed symmetrically with respect to the center plane, the inner structure of the pocket-type chain wheel is adapted in the best possible way to the load case according to this embodiment.

The load carrying capacity and the wear resistance of the pocket-type chain wheel can additionally be improved in that the fibers of the fiber-reinforced plastic exhibit a substantially radial main fiber direction in the interior of the pocket-type chain wheel, preferably in the radially located central area between the pockets and a hub. This advantageous further development allows the fiber structure to take up the compressive forces in the best possible way, said compressive forces are directed inwards radially to the axis of rotation during operation.

In order to obtain wear-resistant pockets, which, when in operation, undergo only little wear due to frictional contact with the link chains, the fibers of the fiber-reinforced plastic may exhibit a substantially surface-parallel main fiber direction on the bottom of the pockets. The main fiber direction on the bottom of the pockets may extend towards a rim, i.e. axially, or in the circumferential direction. An axial main fiber direction on the bottom of the pockets has the advantage that joint lines are urged towards the pocket-type chain wheel rim which is less heavily loaded during operation.

In injection-molded parts, joint lines may form at locations where the flows of plastic melt coming from different directions converge and then solidify. In the area of the joint lines, the main fiber direction is undefined. According to a further advantageous embodiment, the invention therefore provides that the pocket-type chain wheel has on its circumference at least one rim projecting radially with respect to the pockets, and that the joint line or joint lines are mostly, i.e. with a frequency of more than 50%, preferably almost exclusively or exclusively located in this rim. The rim may fulfil a dual function in that it delimits the pockets in the axial direction thus forming a lateral guide means for the chain links running onto the circumferential surface. Of course, also two such rims may be provided at both axial sides of the pockets. By shifting the joint lines into the at least one rim, an undefined fiber direction in the particularly heavily loaded areas of the pocket-type chain wheel will be avoided. The rim is preferably configured such that it is continuous in the circumferential direction and it may slope at an oblique angle towards the center, so as to allow the chain to run onto the chain wheel smoothly.

The pocket-type chain wheel may additionally by provided with an injection-molded, torque-transmitting shaft-hub connection. The shaft-hub connection, e.g. a groove for a tongue-and-groove connection, a cone or splines, is preferably manufactured in a single operation cycle together with the remainder of the pocket-type chain wheel. The pocket-type chain wheel may also be provided with a shaft-hub connection consisting of an insert element encased by injection molding.

In order to increase the reliability, the pocket-type chain wheel may be provided with at least one metal disc encased by means of injection molding, said metal disc being positioned perpendicular to the axial direction and extending between at least a part of the pockets having the same orientation. Thus, the metal disc comes to lie between two successive pockets having the same orientation and prevents the link chain from slipping on the circumferential surface even if the plastic material should be broken at these locations. The metal disc is preferably fully embedded in the pocket-type chain wheel so that it cannot come into contact with the link chain in the area of the pockets, unless the pocket-type chain wheel is damaged or worn to an inadmissible extent. If the encased metal disc were exposed, there would be the risk of local wear of the link chain due to the contact with the metal disc and of a decrease in the load bearing capacity of the link chain. The metal disc may be provided with openings, so that the melt flow can pass through the metal disc. The metal disc may have axially projecting areas so that it can be anchored more reliably in the plastic matrix. The metal disc may be may be a stamped sheet metal part; also the openings and/or the protrusions may be formed by punching/stamping.

In order to obtain a fiber orientation that is advantageous for the mechanical loading capacity of the pocket-type chain wheel, it seems to be of advantage when the pocket-type chain wheel has at least one end face with a, in a topological sense, path-connected, e.g. disc-shaped end wall, in contrast to a spoke- or lattice-like structural design of the end face. A side effect of a structural design including an end wall is to be seen in the reduced soiling tendency in comparison with spokes or a lattice structure. This will be advantageous, in particular if the pocket-type chain wheel is used in areas with strict hygienic regulations or in areas where substances are used, which may attack the plastic material in the long run. The end wall may also define an uninterrupted wall surface, so as to reduce the surfaces that are prone to soiling still further.

In order to increase the damping properties, it will additionally be of advantage when, according to a further embodiment, at least one end face or end wall has provided therein recesses extending axially into the pocket-type chain wheel. These recesses increase the damping characteristics of the pocket-type chain wheel in the radial as well as in the torsional direction. The recesses may especially be configured like blind holes.

In order to affect the strength of the pocket-type chain wheel as little as possible, the recesses may overlap protrusions in the axial direction, said protrusions delimiting pockets for like chain links of the link chain from one another in the circumferential direction and projecting in the axial direction.

The protrusions may have a surface which faces radially outwards and which is located on the level of the radially outwardly directed surface of the at least one rim. In particular, said radially outward surface of the protrusion may continue smoothly in the respective surface of the rim. Strength-reducing abrupt changes in diameter are avoided in this way.

The recesses provided in the case of pocket-type chain wheels for link chains running straight onto the chain wheel may, for example, be arranged between the respective pockets for the horizontal chain links with planes extending parallel to the axial direction. In particular, the recesses may be arranged in axially opposed relationship with one another on the two end faces of such pocket-type chain wheels.

In the case of pocket-type chain wheels for link chains running obliquely onto the chain wheel, the respective recesses may be arranged alternately between like pockets in the end face in which the pockets have the smaller depth. In pocket-type chain wheels with a link chain running obliquely onto the chain wheel, the less deep portion of the pocket may, according to some variants, support the axially outer leg of a chain link. This arrangement guarantees that the pocket-type chain wheel will only be weakened to a minor extent, since the material cross-section will always suffice to take up the mechanical stress occurring during operation.

In order to obtain, during the injection molding process, a uniform flow around the recesses and to maintain in the direction of flow of the plastic melt a flow cross-section that varies only to a minor extent in the course of the injection molding process, it will be of advantage when the volume of the recesses on an end face corresponds, at least approximately, to the volume of the pocket areas facing this end face and separated by the axial protrusions. Alternatively or cumulatively, the pocket volume lying between two successive protrusions in the circumferential direction may correspond to the volume of a recess. These respective measures have the effect that, due to the displacement effect of the recesses, the joint lines are shifted away from the area arranged radially below the pockets, in the direction of the end faces or the at least one rim, if such a rim is provided.

When, according to a further advantageous embodiment, the opening of the recesses narrows outwardly in the radial direction, said opening being positioned in the end faces of the pocket-type chain wheel, and/or the recesses taper in the axial direction into the pocket-type chain wheel in a pyramidal or frusto-pyramidal fashion, it is again possible to avoid the formation of joint lines in these areas.

The bottom of the recesses may be positioned between respective like pockets in the circumferential direction so as to achieve an enhanced flow of melt in the direction of the end faces.

The pockets may be provided with at least one reception groove in the area of their center located in the circumferential direction, said reception grooves being adapted to receive therein the welds of the chain links, when the chain link is accommodated in the pocket. In the area of the welds, the chain links are normally slightly thicker, so that an increased risk of wear exists at the locations where the weld comes into contact with the pocket-type chain wheel. The reception groove opens radially, and said reception groove widens outwards in the radial direction, so that even in the case of link chains with rather coarse positional tolerances the welds can easily enter the reception grooves. The opening angle with which the reception groove widens radially outwards amounts to at least approx. 110° to approx. 130°, preferably approx. 120°. The respective reception groove may be positioned on the axial end face of an axially extending protrusion separating two like pockets from one another.

In the following, the invention will be explained in more detail on the basis of examples and with reference to the figures. In accordance with the above statements, individual features may be omitted in or added to the various embodiments, or features of one embodiment may be used for some other embodiment, depending on whether or not the advantage entailed by the respective feature exists in the case of use taken into account.

Figure 1:
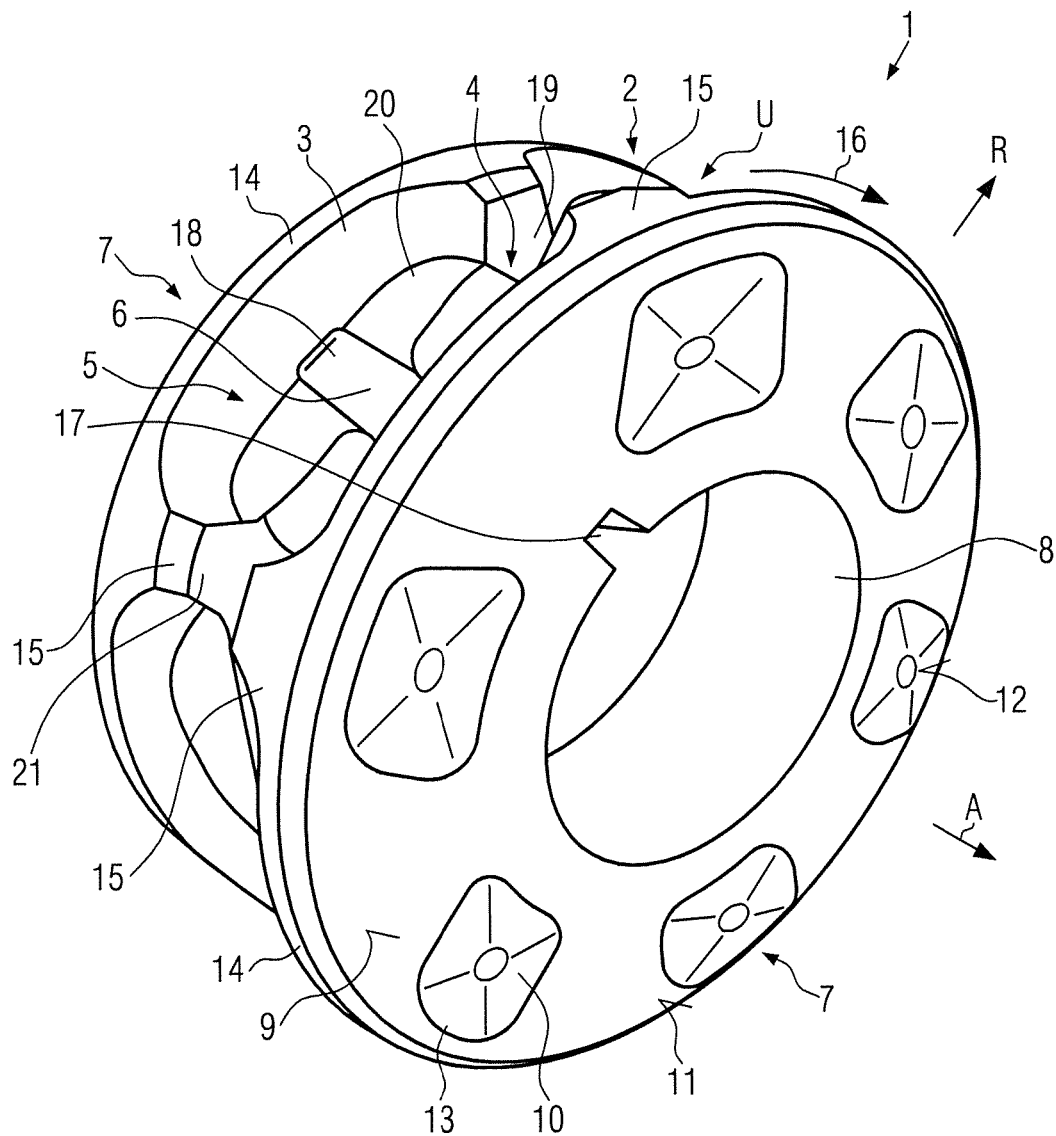
FIG. 1 shows a schematic perspective view of an embodiment of a pocket-type chain wheel according to the present invention, consisting of injection-molded, fiber-reinforced plastic.

To begin with, the structural design of a pocket-type chain wheel 1 according to the present invention is exemplarily explained on the basis of the embodiment according to FIG. 1. The pocket-type chain wheel 1 is preferably injection molded from a fiber-reinforced thermoplastic. The material used for fiber reinforcement are preferably glass fibers. The plastic material may have a density of between 0.9 and 2.5 kg/dm$^3$.

The pocket-type chain wheel 1 has, on its radially outwardly directed circumferential surface 2, pockets 3, 4 having alternately different shapes in the circumferential direction, said pockets accommodating the chain links of a link chain (not shown) during operation. The pockets are formed, by means of a cone mold and/or a cone gate, together with the pocket-type chain wheel in a manufacturing step carried out in the course of the production of the whole pocket-type chain wheel, and they are not subjected to a finishing treatment. FIG. 1 shows, only by way of example, a pocket-type chain wheel for a round steel chain that is guided straight, i.e. with horizontal and upright chain links, over the circumferential surface 2 of the pocket-type chain wheel 1.

The respective pockets 3, 4 have a shape complementary to that of the chain links (not shown). The pockets 3 extend radially into the pocket-type chain wheel 1 less far than the pockets 4. The pockets 3 receive therein the horizontal chain links, whose plane extends parallel to an axial direction A. The pockets 4 receive therein the intermediate upright chain links oriented perpendicular to the axial direction A.

The pockets 3 are divided into two axial subareas 5 by the pockets 4 located in the center plane M of the pocket-type chain wheel 1, said axial subareas 5 being interconnected by an axially extending web 6 in the middle of the respective pocket 3 located in the circumferential direction U. The web 6 separates successive pockets 4.

The pockets 4 have, in the axial direction A, a smaller width than the pockets 3, but extend in the radial direction R more deeply into the pocket-type chain wheel 1. The axial direction A extends parallel to the direction of rotation of the pocket-type chain wheel 1. The respective pockets 3, 4 are displaced relative to one another by half a pocket pitch.

For other forms of link chains, in particular for profile chains or for link chains guided obliquely around the pocket-type chain wheel 1, in the case of which the planes of the chain links extend at an angle, mostly approx. 45° to 55°, to the axial direction A, the pockets 3, 4 do not have the shape shown in FIG. 1, but are configured complementarily to the chain links in a suitable manner.

The pocket-type chain wheel 1 has two end faces 7 facing in the axial direction, only one of these end faces being visible in FIG. 1. In the embodiment according to FIG. 1, the non-visible end face 7 is configured in the same way as the visible end face, which will be described in the following.

The end face 7 has an end wall 9 extending over a wide area, i.e. not only in the area of spokes or lattice sections, continuously from a hub 8 to the circumferential surface 2. The end wall 9 is, in a topological sense, path-connected and preferably approximately disc-shaped.

The end wall 9 may have provided therein one or a plurality of recesses 10. The recesses may taper in the axial direction into the pocket-type chain wheel. They may especially be configured as conical or frusto-conical, pyramidal or frusto-pyramidal recesses. The opening 12 of the at least one recess 10, which is located in the plane 11 of the end wall 9, is trapezoidal in shape in the embodiment according to FIG. 1 and tapers outwardly in the radial direction R. This means that the opening 12 narrows outwardly in the radial direction R. Preferably, all the edges 13 of the recess are strongly rounded so as to prevent an accumulation of dirt.

The pocket-type chain wheel 1 is configured symmetrically with respect to the center plane M in the embodiment shown exemplarily in FIG. 1. The end walls 9 project beyond the pockets 3, 4 in the radial direction R and define a rim 14 protruding in the radial direction R. Preferably, all the joint lines of the pocket-type chain wheel 1 are located in the rim 14.

The rim 14 delimits the pockets 3, 4 in the axial direction A. It defines protrusions 15 projecting in the axial direction A between pockets of the same kind, these pockets being the pockets 3 for the horizontal chain links in FIG. 1. In the case of the pocket-type chain wheel 1 configured for link chains running straight onto the chain wheel, the protrusions 15 are opposed to one another in the axial direction and delimit the pockets 3 in the circumferential direction U. In addition, the protrusions 15 are located on the level of the middle of the pockets 4 in the circumferential direction U. The recesses 10 are distributed in the circumferential direction such that they axially overlap with the protrusions 15.

The volume of a recess 10 corresponds preferably to the volume of the subarea 5 of a pocket 3 located between two protrusions 15, which succeed one another in the circumferential direction U, and arranged on the axial side of the recess 10 in question.

The recesses 10 guarantee on the one hand that, when the pocket-type chain wheel 1 is being produced, the melt will flow through approximately unchanging flow cross-sections, so as to prevent excessive accelerations or decelerations of the melt flow in the course of the injection molding process. On the other hand, the recesses 10 guarantee that, distributed over the circumference of the pocket-type chain wheel, the amounts of material present at the radially outer edges of the pocket-type chain wheel are always approximately identical and that mass concentrations, e.g. in the area of the protrusions 15, are avoided. It is thus guaranteed that the joint lines will not be located in the interior of the pocket-type chain wheel 1. Furthermore, the recesses 10 increase the damping characteristics of the pocket-type chain wheel 1, so that, when in contact with the chain, it will run more smoothly, more silently and with less vibrations.

The hub 8 may define an injection-molded, torque-transmitting shaft-hub connection. FIG. 1 shows, only by way of example, a groove 17 for a tongue-and-groove connection. It goes without saying that this shaft-hub connection may also be replaced e.g. by an injection-molded conical hub or splined hub. Instead of an injection-molded shaft-hub connection, an insert element consisting e.g. of metal and encased by injection molding may be provided. The insert element may define the shaft-hub connection in a preformed manner, so that, once the pocket-type chain wheel has been finished, the shaft-hub connection will be provided in a finished form.

The chain links of the link chains used for pocket-type chain wheels are often made of a bent and butt-welded wire and increased in thickness in the area of the weld. For accommodating the thickening in the pockets 3, 4, each of the pockets 3, 4 has formed therein a reception groove 18, 19 in the area of the respective pocket center located in the circumferential direction. In the pockets 3 used for the horizontal chain links, the reception groove 18 is located on the bottom 20 of the pockets 3 and recedes radially inwards. In the radially outward direction R, the reception groove 18 widens preferably by an angle of approx. 110° to approx. 130°, preferably approx. 120°.

The reception grooves 19 of the pockets 4 for the upright chain links are located between the horizontal pockets 3 on the axially directed end faces 21 of the protrusions 15. The end faces 21 extend down to the bottom of the pockets 4. Also these reception grooves 19 widen radially outwards at an angle of approx. 110° to approx. 130°, preferably approx. 120°. Unlike the reception grooves 18 which recede in the radial direction, the reception grooves 19 recede in the end face 21 in the axial direction. In the radially inward direction, the reception grooves 19 first become narrower and continue then in the radial direction with constant width. The shape of the reception grooves 19 on the bottom of the pockets 4 corresponds to the shape of the reception grooves 18 on the bottom 20 of the pockets 3.

It goes without saying that also the axially inwardly directed walls of the pockets 3 may be provided with an axially receding reception groove, which defines a radially outward extension of the reception groove 18 and the structural design of which corresponds to that of the reception groove 19 in the area of the end faces 21.

Further modifications of the embodiment shown in FIG. 1 are imaginable. It may, for example, be possible to do without the recesses 10, if the pocket-type chain wheel 1 is intended to be used in hygienically sensitive or in particularly heavily soiled areas. Dirt residues are prevented from accumulating on the then smooth end wall 9. It is true that this will result in less efficient damping. Since the loads dealt with in such surroundings are, however, normally small, this drawback can be accepted.

Figure 2:
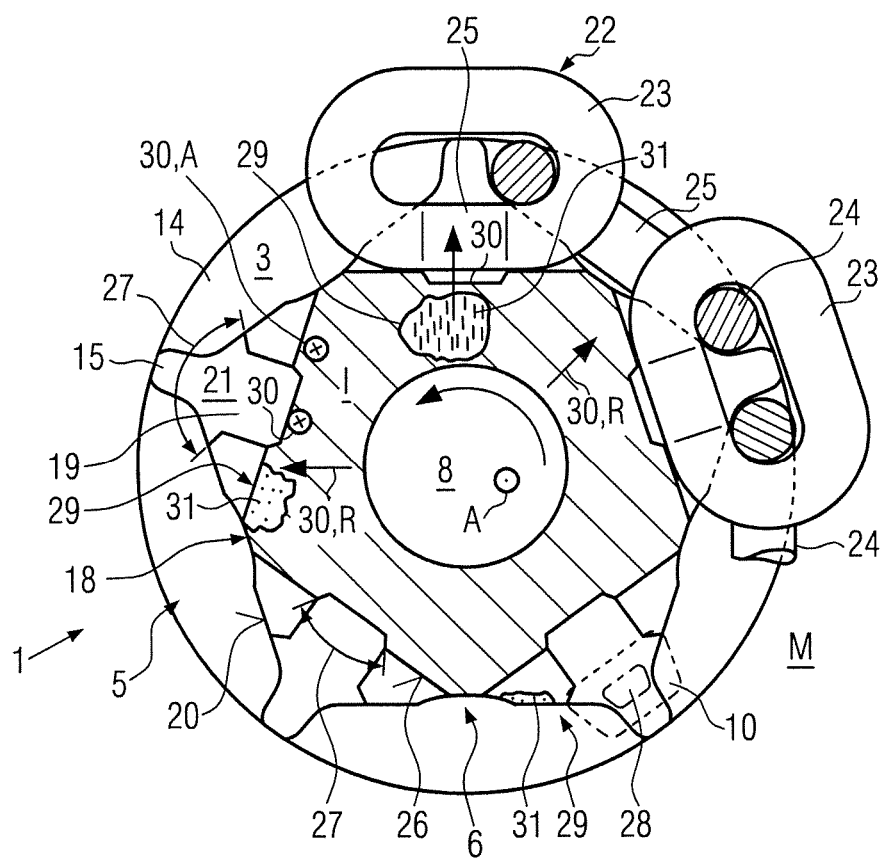
FIG. 2 shows a schematic sectional view through a further embodiment of a pocket-type chain wheel according to the present invention.

FIG. 2 shows a schematic sectional view through the axial center plane M of a further embodiment of a pocket-type chain wheel 1 perpendicular to the axial direction A. To make things easier, elements that have already been described in connection with the embodiment according to FIG. 1 with respect to their function and/or their structural design will be designated by the same reference numerals.

For making the embodiment more easily understandable, part of a link chain 22, here a round steel chain, with chain links 23, 24 is shown. The upright chain links 23 are positioned in the deep and narrow pockets 4 in the axial center plane 4. The chain links 23, 24 may rest on the respective bottom 20, 26 of the pockets 3, 4. The chain links 23, 24 have a thickened weld 25.

In FIG. 2 it can be seen that the recesses 10 (only one recess is exemplarily shown) overlap in the axial direction A and that a bottom 28 of the recesses 10 may lie within the axial projection of the protrusion 15. The recess 10 may extend between two successive like pockets 3 in the axial direction so far down that the bottom 28 is positioned between these pockets in the circumferential direction U.

Details 29 schematically show the fiber-reinforced plastic in an enlarged representation. The main fiber direction 30, i.e. the direction in which most of the fibers 31 reinforcing the plastic are oriented, is directed in the radial direction R in the interior I of the pocket-type chain wheel, in the area between the pockets 3, 4 and the hub 8. On the bottom 20, 26 of the pockets 3, 4, the main fiber direction 30 extends, however, surface-parallel, preferably in the axial direction A towards the rim 14. With respect to the center plane M, the main fiber directions 30 are symmetrically distributed.

The radial main fiber direction 30 in the interior I of the pocket-type chain wheel imparts a high pressure resistance and, consequently, a high load carrying capacity to the pocket-type chain wheel 1. The surface-parallel fiber orientation on and directly below the pockets 3, 4 makes the respective pocket bottom 20, 26 highly resistant to wear.

At least on the bottom 20, 26 of the pockets 3, 4, preferably, however, in the area of the whole circumferential surface 2 and/or the whole surface of the pocket-type chain wheel 1, the plastic material exhibits an increased bending strength in comparison with the interior I, so that the chain links rest stably on the bottom 20, 26 of the pockets. The surface-parallel orientation of the main fiber direction 30 in the boundary area causes an increase in the bending strength. Through an accurate temperature control during the injection molding process, e.g. by controlling the cooling rate or by controlling the temperature of the injected melt throughout the injection molding period, the formation of crystalline or semi-crystalline structures and, consequently, also a higher bending stiffness can be supported.

The interior I of the pocket-type chain wheel exhibits a higher pressure stability than the boundary areas. The load carried by the link chain can thus be conducted to the hub without any flow being caused.

Figure 3:
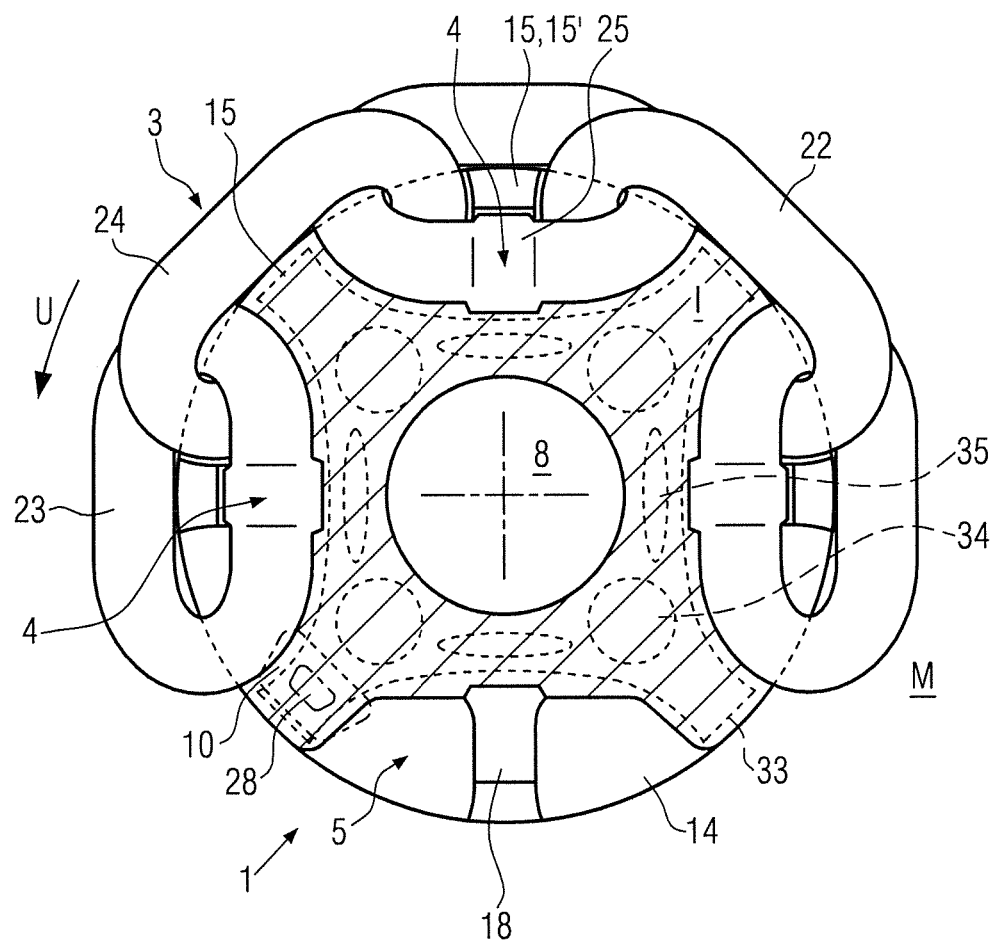
FIG. 3 shows a schematic sectional view through a further embodiment of a pocket-type chain wheel according to the present invention.

FIG. 3 shows an embodiment of a pocket-type chain wheel 1 for a link chain 22 running obliquely onto the chain wheel. To make things easier, elements that are already known from the description of the preceding embodiment with respect to their function and/or their structural design will be designated by the same reference numerals.

As can be seen, the pockets 3, 4 have shapes that are different with respect to certain details, due to the change in the position of the chain in comparison with the embodiment according to FIGS. 1 and 2. Nevertheless, the elements provided correspond, in principle, to those of the preceding embodiment. The pockets 3, 4 still alternate in the circumferential direction U. Between respective pockets of the same type, a protrusion 15 is provided, as can be in FIG. 3 on the basis of the pockets 4.

The respective protrusions 15, which are located between the pockets 3 and which are identified by 15' in FIG. 3 for the sake of clarity, are displaced in the circumferential direction U by half a pocket pitch relative to the protrusions 15 located between the pockets 4.

Also in the case of the pocket-type chain wheel according to FIG. 3, each protrusion 15 has associated therewith a recess 10. For the sake of clarity, only one recess 10 is shown in FIG. 3. Other than in the case of the embodiment according to FIG. 1, the respective recesses on the two end faces 7 (not shown in FIG. 3) are also displaced relative to one another by half a pocket pitch in accordance with the associated protrusions. A recess associated with a protrusion 15 is positioned on the end face 7 on which the respective rim 14 forms a protrusion 15.

Also according to the embodiment of FIG. 3, the respective pockets 3, 4 comprise the reception grooves 18, 19, the respective reception grooves 18, 19 of said pockets 3, 4 being identical in shape. The reception grooves 18 define depressions in the axial direction and open outwards in the radial direction with an opening angle between 110 to 140°.

The orientation of the fibers in the interior I of the pocket-type chain wheel 1 corresponds to that according to the embodiment shown in FIGS. 1 and 2. As in the case of the preceding embodiment, the main fiber directions 30 follow the symmetry of the pocket-type chain wheel 1.

The pocket-type chain wheel 1 may comprise at least one metal disc 33 or a pair of axially spaced-apart metal discs 33, which are encased with fiber-reinforced plastic by means of injection molding. The at least one metal disc 33 is positioned coaxially with the hub 8. It may be provided with openings 34 so as not to impair the melt flow during the production of the pocket-type chain wheel 1. The metal disc 33 extends, when seen in the circumferential direction, between at least one type of pockets 3 or 4, so that the link chain 22 can rest thereon if the plastic matrix should break. The metal disc 34 may be provided with axially projecting portions 35 so that it can be anchored more reliably in the plastic matrix.

The metal disc 33 may be a stamped sheet metal part. The openings 34 may be formed by punching. The portions 35 may be formed of punched-out and bent tongues.

The metal disc may also be used for a pocket-type chain wheel used for chains that run straight onto the wheel.

LIST OF REFERENCE NUMERALS

| | |
|---|---|
| 1 | pocket-type chain wheel |
| 2 | circumferential surface |
| 3 | pockets |
| 4 | pockets |
| 5 | subareas of pockets 3 |
| 6 | web between subareas 5 |
| 7 | end face |
| 8 | hub |
| 9 | end wall |
| 10 | recess |
| 11 | plane of the end wall |
| 12 | opening of the recess |
| 13 | edges of the recess |
| 14 | rim |
| 15 | protrusions |
| 17 | groove in the hub |
| 18 | reception groove for the weld in pockets 3 |
| 19 | reception groove for the weld in pockets 4 |
| 20 | bottom |
| 21 | end faces of protrusions 5 |
| 22 | link chain |
| 23 | upright chain links |
| 24 | horizontal chain links |
| 25 | weld |
| 26 | bottom of pockets 4 |
| 27 | opening angle |
| 28 | bottom of recess 10 |
| 29 | enlarged details |
| 30 | main fiber direction |
| 31 | fibers |
| 33 | metal disc |
| 34 | opening of the metal disc |
| 35 | axially projecting portion |
| A | axial direction |
| I | interior of the pocket-type chain wheel |
| M | center plane of the pocket-type chain wheel |
| R | radial direction |
| U | circumferential direction |

The invention claimed is:

1. A pocket-type chain wheel (1) for link chains (22), in particular round or profile steel chains, the circumferential surface (2) of said pocket-type chain wheel (1) being provided with pockets (3, 4) having alternately different shapes in the circumferential direction (U) and extending radially into the pocket-type chain wheel, wherein the pocket-type chain wheel (1) is produced in one piece from at least one fiber-reinforced plastic by means of an injection molding process characterized in that fibers (31) of the fiber-reinforced plastic exhibit a substantially radial main fiber direction (30) in a radial direction (R) in an interior (I) of the pocket-type chain wheel (1) between the pockets (3, 4) and a hub (8) and a substantially surface-parallel main fiber direction (30) on a bottom (20, 26) of the pockets (3, 4).

2. The pocket-type chain wheel (1) according to claim 1, characterized in that the bending strength of the pocket-type chain wheel (1) is higher on the bottom (20, 26) of the pockets (3, 4) than in the interior (I).

3. The pocket-type chain wheel (1) according to claim 1 or 2, characterized in that the pressure resistance in the interior (I) of the pocket-type chain wheel (1) is higher than on the bottom (20, 26) of the pockets (3, 4).

4. The pocket-type chain wheel (1) according to claim 1, characterized in that main fiber directions (30) of fibers (31) are distributed symmetrically with respect to a center plane (M) of the pocket-type chain wheel (1), said center plane (M) extending perpendicular to an axial direction (A).

5. The pocket-type chain wheel (1) according to claim 1, characterized in that the pockets (3, 4) are not subjected to a chip-removing finishing treatment.

6. The pocket-type chain wheel (1) according to claim 1, characterized in that joint lines are predominantly located in a rim (14) which axially delimits at least a part of the pockets (3, 4).

7. The pocket-type chain wheel (1) according to claim 1, characterized in that the pocket-type chain wheel (1) is provided with an injection-molded, torque-transmitting shaft-hub connection (17) or with a shaft-hub connection consisting of an insert element encased by injection molding.

8. The pocket-type chain wheel (1) according to claim 1, characterized in that the pocket-type chain wheel (1) comprises disc-shaped end walls (9).

9. The pocket-type chain wheel (1) according to claim 8, characterized in that at least one of the end walls (9) has provided therein recesses (10) extending axially into the pocket-type chain wheel (1).

10. The pocket-type chain wheel (1) according to claim 9, characterized in that the recesses (10) are arranged in the radial direction (R) below protrusions (15) delimiting pockets for like chain links (23, 24) of the link chain (22) from one another in a circumferential direction (16) and projecting in an axial direction (A).

11. The pocket-type chain wheel (1) according to claim 9, characterized in that a volume of the recesses (10) corresponds, at least approximately, to a volume of subareas (5) of the pockets (3, 4) separated by protrusions (15), said subareas (5) being located between said protrusions (15).

12. The pocket-type chain wheel (1) according to claim 10, characterized in that an opening (12) of the recesses (10) narrows outwardly in the radial direction (R), said opening (12) being positioned in end faces (7) of the pocket-type chain wheel (1).

13. The pocket-type chain wheel (1) according to claim 10, characterized in that the recesses (10) taper in the axial direction (A) into the pocket-type chain wheel.

14. The pocket-type chain wheel (1) according to claim 1, characterized in that at least one form of the pockets (3, 4) is provided with a reception groove (18, 19) for a weld (25) of a chain link (23, 24), said reception groove (18, 19) receding in an axial direction (A), and that the reception groove (18, 19) widens in the radial direction (R) at its radially outward directed end.

15. The pocket-type chain wheel (1) according to claim 14, characterized in that the reception groove (18, 19) widens at its radially outer end with an opening angle (27) of approx. 120°.

16. The pocket-type chain wheel (1) according to claim 14 or 15, characterized in that the respective reception groove (19) is located on an axial end face (21) of an axially projecting protrusion (15), which separates two pockets (3, 4) of the same type from one another.

* * * * *